(12) United States Patent
Campos et al.

(10) Patent No.: US 10,524,227 B2
(45) Date of Patent: *Dec. 31, 2019

(54) MULTICAST AIDED COOPERATIVE BEAMFORMING WIRELESS SYSTEM

(71) Applicant: Cable Television Laboratories, Inc., Louisville, CO (US)

(72) Inventors: Luis Alberto Campos, Superior, CO (US); Alireza Babaei, Westminster, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,949

(22) Filed: Jun. 18, 2019

(65) Prior Publication Data

US 2019/0313362 A1 Oct. 10, 2019

Related U.S. Application Data

(63) Continuation of application No. 16/032,929, filed on Jul. 11, 2018, now Pat. No. 10,327,220.

(Continued)

(51) Int. Cl.
| | |
|---|---|
| *H04W 64/00* | (2009.01) |
| *H04W 56/00* | (2009.01) |
| *H04B 7/06* | (2006.01) |
| *H04W 4/06* | (2009.01) |
| *H04B 7/024* | (2017.01) |
| *H04L 5/00* | (2006.01) |
| *H04B 17/318* | (2015.01) |
| *H04B 17/12* | (2015.01) |
| *H04B 17/00* | (2015.01) |
| *H04W 52/28* | (2009.01) |
| *H04W 48/20* | (2009.01) |

(52) U.S. Cl.
CPC .......... *H04W 64/003* (2013.01); *H04B 7/024* (2013.01); *H04B 7/0617* (2013.01); *H04B 17/0085* (2013.01); *H04B 17/12* (2015.01); *H04B 17/318* (2015.01); *H04L 5/0048* (2013.01); *H04W 4/06* (2013.01); *H04W 52/283* (2013.01); *H04W 56/006* (2013.01); *H04W 56/0045* (2013.01); *H04W 48/20* (2013.01)

(58) Field of Classification Search
CPC ... H04W 64/003; H04W 48/20; H04B 7/0617
USPC ...... 455/456.1, 414.1, 422.1, 418, 421, 423, 455/410
See application file for complete search history.

(56) References Cited

U.S. PATENT DOCUMENTS

| | | | |
|---|---|---|---|
| 2006/0245349 A1 | 11/2006 | Vrzic | |
| 2014/0315593 A1* | 10/2014 | Vrzic | ............ H04W 52/38 455/522 |

(Continued)

*Primary Examiner* — Nghi H Ly
(74) *Attorney, Agent, or Firm* — Great Lakes Intellecual Property, PLLC

(57) ABSTRACT

A cooperative wireless system using a multicast protocol to facilitate coordinating coherent addition and subtraction of wireless signaling or other beams originating from a plurality of antenna units at a target location is contemplated. The system may utilize multicast-based regulation and distribution of transmission control parameters necessary for the antenna units to synchronize the wireless signaling in a manner sufficient to enable the coherent addition and subtraction thereof at the target location.

12 Claims, 4 Drawing Sheets

Related U.S. Application Data

(60) Provisional application No. 62/531,503, filed on Jul. 12, 2017.

(56) References Cited

U.S. PATENT DOCUMENTS

| | | |
|---|---|---|
| 2015/0017939 A1 | 1/2015 | Waters |
| 2017/0279674 A1* | 9/2017 | Zhu .................... H04L 41/0806 |
| 2017/0374575 A1* | 12/2017 | Kahtava ................ H04W 48/16 |

* cited by examiner

MULTICAST AIDED COOPERATIVE BEAMFORMING WIRELESS SYSTEM

CROSS-REFERENCE TO RELATED APPLICATIONS

This application is a continuation of U.S. application Ser. No. 16/032,929 filed Jul. 11, 2018, which in turn claims the benefit of U.S. provisional Application No. 62/531,503 filed Jul. 12, 2017, the disclosure of which is incorporated in its entirety by reference herein.

TECHNICAL FIELD

The present invention relates to multicast aided wireless signaling systems, such as but not necessary limited to wireless signaling systems including a plurality of spatially separated remote antenna units having capabilities sufficient to facilitate coordinating beamforming or otherwise directing wireless signaling to a target location whereat signaling from multiple antenna units may be coherently added.

BACKGROUND

Increasing demand for capacity has led to deployment of densely distributed wireless networks, e.g. non-cellular, cellular and/or mixed-use networks. Flexible provisioning of capacity to targeted locations can be realized by coordinating transmission of the same signal from multiple locations using different beams so that these signals can add in phase at a target location to produce an effective signal having a greater signal-to-noise ratio and improved capacity than the individual beams could provide independently. The number of antennas deployed with beamforming capabilities suitable for this approach may increase in the future such that a need is recognized for a system that can manage the attendant resources in a flexible and agile manner. One non-limiting aspect of the present invention contemplates addressing this future need with a multicast aided cooperative beamforming wireless system having capabilities sufficient to facilitate the complex message delivery and signaling synchronization necessary to enable coherent addition and subtraction of wireless signaling at a target location when the corresponding wireless signaling originates from multiple remote antenna units, which may optionally be spatially separated across a geographical area.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
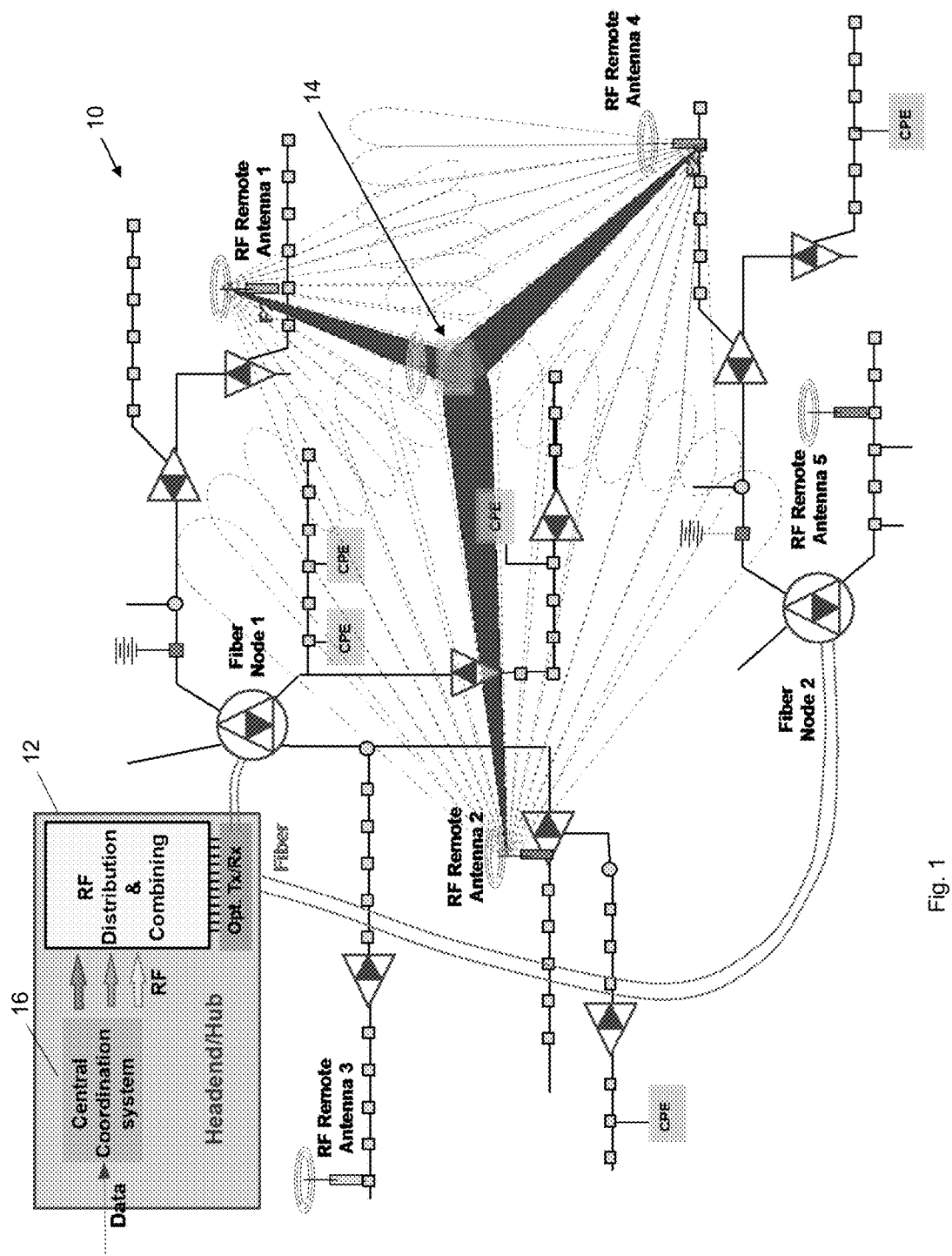
FIG. 1 illustrates a communication system in accordance with one non-limiting aspect of the present invention.

FIG. 1 illustrates a communication system 10 in accordance with one non-limiting aspect of the present invention. The system 10 may be configured to facilitate electronic signaling between a signal processor/headend/hub 12 and premise equipment (CPE), user equipment (UE), access points (APs), terminals or other devices, which may be collectively referred to as end stations (ESs). The signal processor 12 may be configured to facilitate transport of virtually any type of signaling, including signaling associated with a multiple system operator (MSO), such as but not necessarily limited to a cable, satellite, or broadcast television service provider, a cellular service provider, and high-speed data service provider, an Internet service provider (ISP), etc. The end stations may correspond with any electronically operable device having capabilities sufficient to facilitate directly or indirectly interfacing a user with signaling transported through the communication system 10. The end stations may be a gateway, a router, a computer, a mobile phone, a cellular phone, a media terminal adapter (MTA), a voice over Internet protocol (VoIP) enabled device, a television, a set top box (STB), network address translator (NAT), etc.

The present invention contemplates distinguishing between wireless and wireline communications for explanatory purposes. The wireline communications may correspond with any type of electronic signal exchange where a wire, a coaxial cable, a fiber or other bound medium is used to facilitate or otherwise direct at least a portion of the related signaling. The wireline communications include but are not necessarily limited to those carried at least partially over a fiber/cable backbone associated with a cable television distribution system, commonly referred to as a hybrid fiber coaxial (HFC) system, or an Internet or non-Internet based data communication system. The wireless communications may correspond with any type of electronic signal exchange where an antenna, antenna port or other transmitting type of device is used to communicate at least a portion of the signaling as radio frequency (RF) signals, such as over a wireless link or through an unbound or air medium. The wireless communications may include but are not necessary limited to satellite communications, cellular communications (e.g., LTE) and Wi-Fi communications. The use of wireline and wireless communications and the corresponding mediums are not intended to limit the present invention to any medium, protocol, or standard and is instead noted to differentiate between two types of communications, e.g., bound and unbound.

The signaling desired for transports through the communication system 10 may be received at the signal processor 12 and thereafter carried by one or more fibers to a fiber node from which a plurality of coaxial cables may facilitate further delivery to different geographical areas, optionally with use of splitters and/or amplifiers. The coaxial cables are shown to include a plurality of taps (shown as rectangles) through which various end stations may be connected to receive the wireline signaling and/or other signaling associated with the headend, e.g., signaling associated with other types of content and/or data transmissions. One non-limiting aspect of the present invention contemplates a plurality of remote antenna units being dispersed at geographically spaced taps within the system to facilitate wireless signaling at a target location 14, which is shown for exemplary purposes to correspond with the location of an end station being targeted for coherent communications. While the present invention is predominately described with respect to utilizing an HFC type of cable network, the present invention is not necessary so limited and fully contemplates its use and application in facilitating wireless signaling to a target location irrespective of the communication medium utilized to provide signaling, information, data, etc. to the remote antenna units for subsequent transport to the target location.

One non-limiting aspect of the present invention contemplates employing multiple remote antenna units fed by the network to generate coordinated beams that coherently add over the target location, which is shown for exemplary purposes to correspond with three of the five available remote antenna units actively coordinating beams to coherently add at the target location. A central coordination system 16 in the hub or headend location may be used to distribute information via the remote antenna units to the target location by means of a collection of beams from the different remote antenna units. A common timing reference available at the hub or headend may be used to synchronize transmissions and add precise delays to the transmissions traversing each of the remote antenna units such that all signals arrive in phase at the target end device. The central coordination system may include a non-transitory computer-readable medium having a plurality of non-transitory instructions executable with a processor associated therewith to facilitate generating control parameters required for controlling and synchronizing the remote antenna units to provide coherent addition and subtraction of wireless signaling. The transmission path distance to an end device through each remote antenna unit is typically different due to the remote antenna units being unequally spaced relative to the target location, unequal distribution of interferences from other signaling or objects, etc. A multi-antenna ranging process may be employed to facilitate assessing the variability associated therewith to enable a coordinated process for synchronizing wireless signaling of the remote antenna units.

Initially, an end device may connect to the network through one of the plurality of remote antenna units available for communication therewith. To connect through one of the remote antenna units, an initial rough initialization or authentication process may take place to avoid overlap between transmissions from other end devices, e.g., to designate one of the plurality of remote antenna units as a primary controller or initial or temporary interface to the end station. A more precise timing process or ranging process may take place when in-phase addition of two or more signals is required, i.e., when a need or desirability arises to facilitate coherent addition and/or subtraction of wireless signaling at the target location for multiple remote antenna units. The remote antenna units may have certain degree of intelligence, such as in the form of a computer-readable medium having a plurality of non-transitory instructions executable with a processor associated therewith, which may allow them to detect downstream traffic intended for the end devices being serviced. The remote antenna units detecting traffic to be transmitted therefrom may then parse control parameters included within attendant messaging to decode the portions of the information required to adjust delay and amplitude, beam information, channel frequencies, etc. to facilitate communications with the target location.

A training signal may be distributed as part of the ranging process to facilitate synchronizing signaling to the target location after the end station is initially associated with one of the remote antenna units. The reception of the training signal from two remote antenna units may be used to determine whether one of the remote antenna units, or the signaling associated therewith, is lagging or is ahead in relation to the other remote antenna units intended to facilitate coherent signaling with the targeted end stations. Timing discrepancies, calculations or other factors derived from monitoring arrival of the test signals at the targeted end station may then be used to facilitate determining adjustments necessary to synchronize signal delivery in a manner sufficient for coherent addition and subtraction. The initial remote antenna through which transmission was established may be used as reference for timing calibration purposes, which may be a remote antenna unit (RAU) referenced by the index "0". The next antenna that contributes to the signal may be labeled with index 1, the next one with index 2 and so on. The training signal that is sent in the downstream, i.e., from the signal processor to the remote antenna units, may include a header indicating the wireless end device ID to which the training signal is targeted along with ranging parameters characterizing the training signal in the payload. In one embodiment, a payload with a sinusoidal signal can be used.

This training signal payload can be divided in multiple synchronization segments depending on the number of additional remote antenna units that can potentially participate. Three segments may be used if three remote antenna units in addition to the reference remote antenna unit participate. It may be the task of the remote antenna units identified with indices higher than 0 to change the phase of their training signal segment by 180° as it traverses the remote antenna unit. This way, assuming the amplitude has also been calibrated, the corresponding test signal would be cancelled during the segment corresponding to the additional remote antenna as it reaches the wireless end device. The segment duration is known such that the cancellation period would allow the central coordination system to automatically determine when the precise delay has been achieved, i.e., when ranging parameters associated with the remote antenna units have been iteratively set to sufficiently cancel/subtract its test signal from a reference test signal associated with the remote antenna unit having an index of 0. Due to variability in the wireless environment it may be better to detect a minimum or complete cancellation rather than a maximum value, e.g., rather than coherently adding the signaling to create the maximum value, a more definitive metric may be determined by coherently subtracting/canceling the test signals with the 180° phase shift.

The information gathered through the ranging process by the targeted end station may be communicated to the central coordination system in response messages for purposes of calculating additional adjustments in amplitude and phase for the remote antenna units associated with each segment, i.e., the ranging parameters may be iteratively adjusted until suitable to facilitate coherent communications. This precise ranging process may be determined for each remote antenna that could contribute in building the composite signal at the target location, such as when new remote antenna units are added to the system through installation, power up or otherwise activated. The training header included in messages sent to the remote antenna units as part of the ranging process may contain information regarding which remote antenna unit(s) should introduced the 180° shifted segment marker. Such ranging messages may include specifically addressing a new remote antenna unit and/or periodically requesting to verify participating remote antenna unit to make sure that nothing has changed. It may take a few ranging iterations until the phase and delay adjustment has been accurately obtained for each of the remote antenna units, i.e., to determine the ranging parameters necessary for the remote antenna unit to perform the desired cancellation at the target location. The central controller can request the adjustment for the next remote antenna unit (index 2) once the phase and delay are fully compensated for the prior remote antenna unit (index 1) and then on to each remote antenna unit until all the ranging parameters for cancellation are determined. Other events such as a sudden decrease in signal to noise ratio of the receiver or low bit error rate would also trigger ranging messages or re-instigation of the ranging process.

At a conclusion of the ranging process when ranging parameters for each of the plurality of remote antenna units available for communication to the target location are determined, the central coordination system may utilize those parameters to calculate control parameters for use in facilitating data, information or other non-ranging transmissions to the target location. One non-limiting aspect of the present invention contemplates facilitating such communications with the target location using multicast protocols to facilitate selecting one or more of the available plurality of remote antenna units for data delivery. The multicast protocol may be used to determine which of the capable remote antenna units to start contributing a beam towards the targeted end device. As signaling dynamics change or communication resources require redistribution, the multicast protocol may be utilized to facilitate pruning and joining additional remote antenna units, optionally re-instigating the ranging process to account for signaling influences resulting from adding or removing the remote antenna units. The multicast protocol may be characterized as a communication process whereby multicast messages having a payload or other information desired for communication to the target end station may be transmitted in a one-to-many arrangement from the signaling processor to each of the plurality of antenna units and/or to one or more antenna units selected to be members of the multicast group. The corresponding antenna units may then utilize control parameters in the multicast messages to facilitate corresponding transmission to the target location of a payload or other information included therein.

Figure 2:
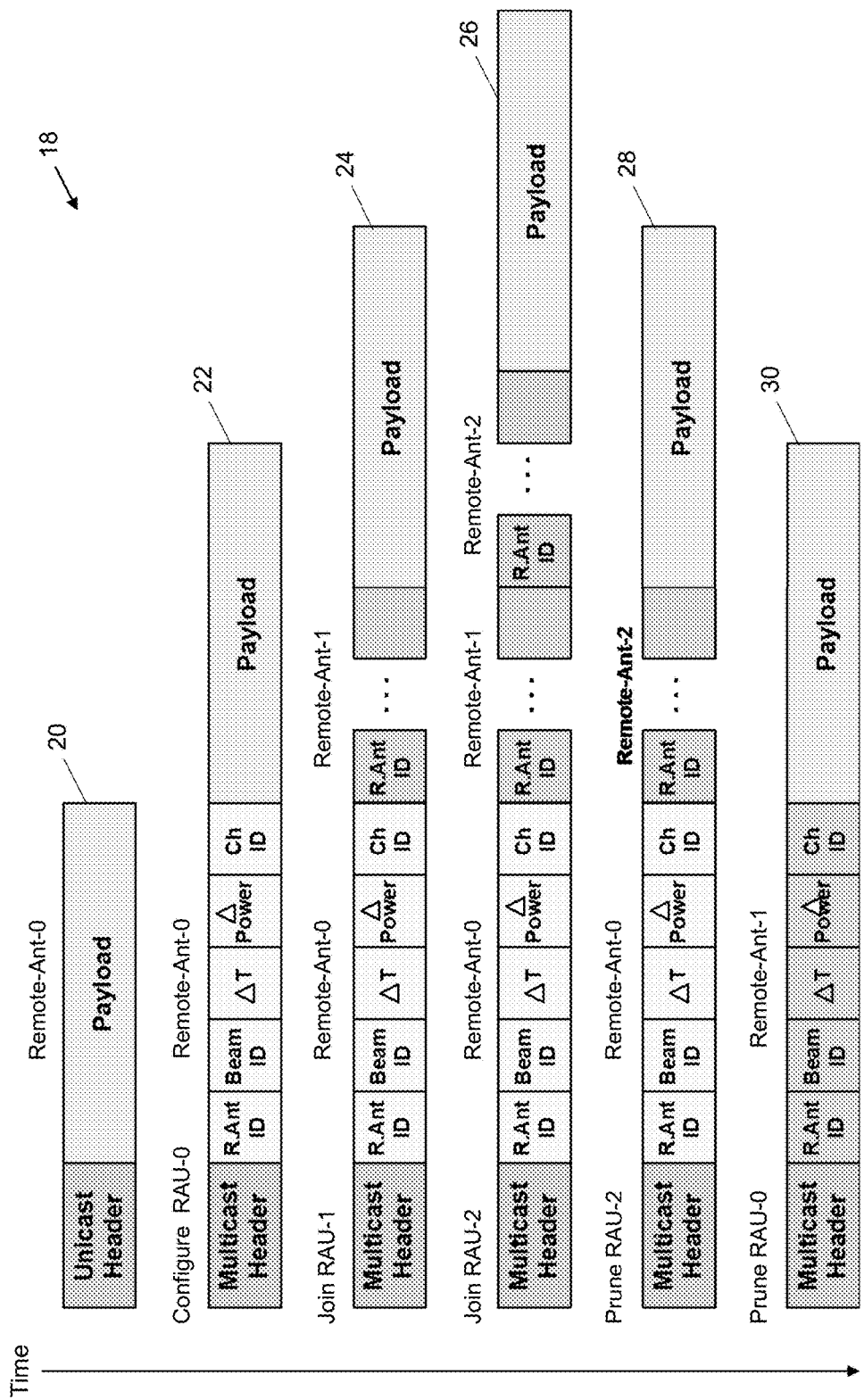
FIG. 2 illustrates a multicast protocol in accordance with one non-limiting aspect of the present invention to facilitate multicast aided coordination.

FIG. 2 illustrates a multicast protocol 18 having a sequence of messages in accordance with one non-limiting aspect of the present invention to facilitate multicast aided coordination. The sequence illustrates a plurality of messages 20, 22, 24, 26, 28, 30 being transmitted from the central coordination system to facilitate and aid in cooperative beamforming as network conditions change over time. The multicast messages may be broadcasted to all of the available remote antenna units, e.g., to the five illustrate remote antenna units may each have completed the ranging process, or selectively to one or more remote antenna units designated as members of a corresponding multicast group. The exemplary description herein presumes the multicast messages are transmitted to each available remote antenna unit such that each remote antenna unit within the distribution path receives the same multicast message. The remote antenna units would then individually identify whether the message directs that remote antenna units to act in response. The information necessary for the remote antenna units to determine whether to act in response may be entirely included within a header of the messages, i.e., everything leftward of the payload. The headers may include control parameters sufficient for identifying the remote antenna units to transmit the payload and the delay, power or other adjustments needed for the payload transmissions (beams) to arrive in concert with identical payloads directed to the same target location from other remote antenna units.

The illustrated messages exemplarily depict a unicast message 20 and a plurality of multicast message types 22, 24, 26, 28, 30. The unicast message 20 may be utilized to facilitate initial communication/authorizations with the target device in the event multiple remote antenna units are not expected to be used for facilitating communications with the target access point or for other situations when it may be undesirable to multicast the attendant information. The unicast message 20 may optionally omit some or all of the contemplated control parameters as it may be unnecessary to utilize the corresponding control parameters to synchronize operation with other remote antenna units due to the unicast message optionally being contemplated for single source or non-coherent signaling. The multicast message types 22, 24, 26, 28, 30 are illustrated to depict a hypothetical sequence of events following use of the unicast message to initially communicate with an end station whereafter multicast protocols may be employed to facilitate synchronizing multiple beams to add coherently at the target location. The header of each of the multicast message types 22, 24, 26, 28, 30 may include the control parameters necessary to synchronize signaling with each message including control parameters sufficient for all of the remote antenna units intended to transmit the corresponding payload to the target location. While predominately described with respect to the multicast message types 22, 24, 26, 28, 30 including control parameters for each remote antenna unit intended for transmitting an included payload, individual messages or unicast messages may alternatively be employed to individually communicate with remote antenna units such that multiple messages having the same payload but with different control parameters are transmitted to each of the one antenna units intended participate in the coherent beamforming. Optionally, all remote antenna units that are part of the multicast group receive and manipulate the same multicast message. When fewer remote antenna units participate in the multicast group, the message may be shorter such that this message grows or shrinks based on how many are participating in this multicast group. Each remote antenna unit may only use the portion of the multicast message that pertains to it, in addition to the payload that is common to all remote antenna units. A first or a second multicast message is not intended to reference a sequence and is rather intended to be a type of multicast message that is periodically sent until a change in the number of participants in the multicast group occurs when a second type of multicast message occurs.

The control parameters may be positioned in the header between addressing/routing information and the payload and are illustrated for exemplary purposes to include a remote antenna unit ID (R.Ant ID), a beam ID, a $\Delta T$ value, a $\Delta P$ value and a channel ID, however, additional control parameters and/or information may be similarly included without deviating from the scope and contemplation of the present invention. The remote antenna unit ID may be utilized to identify the individual remote antenna unit associated with the control parameters, such as to provide a mechanism for the remote continues to individually distinguish the control parameters associated therewith. The beam ID may be utilized to identify the beam or signal intended for transmitting the payload, such as to enable the targeted end station to differentiate one beam from another. The $\Delta T$ value may represent a timing offset or differential of the associated remote antenna unit from the reference or index 0 antenna unit, such as to enable the corresponding remote antenna unit to determine when it should transmit its signal for coherent arrival at the target location. The ΔP value may specify a power level, signal strength, amplitude or other energy-related parameter of the signals to be transmitted from the corresponding remote antenna unit, such as to facilitate matching signal strength at the target location. The channel ID may be utilized to identify a frequency band or individual channel over which the corresponding remote antenna unit is to transmit its signaling. The payload may correspond with information, data or other material desired to be wirelessly transmitted to the target location.

A first multicast message 22 may include a first set of control parameters for defining wireless transmission of a first payload to the target end station. The first multicast message may correspond to a type of control parameters when only one RAU is a member of the multicast group. This message type may repeat periodically until a change in the multicast group takes place, e.g., until an additional member is added whereupon the second type of multicast message 24 is used. The first message 22 may correspond with a situation in which it is desirable for a single remote antenna unit or a multicast group with a single member communicating with the target end station, such as when loading or other operational demands limit the available remote antenna units and/or in the event initial communications are necessary prior to additional remote antenna units joining a multicast group. A second multicast message 24 may correspond with a joining operation where a second remote antenna unit/member joins the first multicast group to form a second multicast group to communicate with the target end station, such as in response to the second remote antenna unit becoming available, operational demands requiring additional signaling or conditions ripening to permit coherent signaling at the target location. The second multicast message may include the first set of the control parameters used for the sole/first member of the first multicast group and additionally a second set of control parameters for defining wireless transmissions from the second member of the second multicast group. The second multicast message 24 may include a second payload for transmission to the target end station from each of the members in the second multicast group, i.e., each of the first member and the second member wirelessly transmit the same, second payload (identical information/data) to the target location to facilitate coherent addition of the two payloads.

A third multicast message 26 may be similar to the second multicast message 24 in so far as being used to add another remote antenna unit for purposes of creating a third multicast group having three members capable of coherently communicating wireless signaling to the target location. The third multicast message 26 may include a third set of control parameters for defining signaling of the newly added third member to form a third multicast group. The third message may similarly include a third payload for transmission to the target end station from each of the members in the third multicast group. A fourth multicast message 28 may correspond with a pruning operation where the third member of the third multicast group may be removed to re-form the second multicast group or a new, fourth multicast group for purposes of transmitting a fourth payload. The fourth multicast message 28 may remove the control parameters for the third member of the third multicast group, thereby effectively eliminating the third member without having to notify the third member of its removal or otherwise particularly address messaging to it for purposes of instructing it to avoid transmission of the fourth payload. A fifth multicast message 30 may be used for purposes of removing the first member from the fourth multicast group to create a fifth multicast group for purposes of transmitting a fifth payload to the target and station.

The coordination system may optionally continue to transmit additional multicast messages in the foregoing manner, optionally joining or pruning members to form new multicast groups as network conditions warrant, to facilitate transport of different payloads to the target end station. The central coordination system may operate in this manner to generate various multicast messages for purposes of selectively adding and removing remote antenna units from multicast groups depending on desired communication parameters, optionally adding or removing members from the multicast groups by correspondingly adding or removing control parameters from headers of the multicast messages. The identicality of the messages being received at the remote antenna units leverages capabilities of multicast protocols to facilitate dissemination of matching payloads to a plurality of remote antenna units for purposes of coherently signaling the payload to the target location according to control parameters individually specified for each member of the transmitting, multicast group. Such one-to-many communications may be beneficial in enabling members to be dynamically added and removed from multicast groups by simply removing corresponding control parameters from headers of the related messaging. The central coordination system may generate the corresponding messages and optionally update or otherwise change the control parameters according to network variances, which may be dynamically determined through periodic ranging operations.

Figure 3:
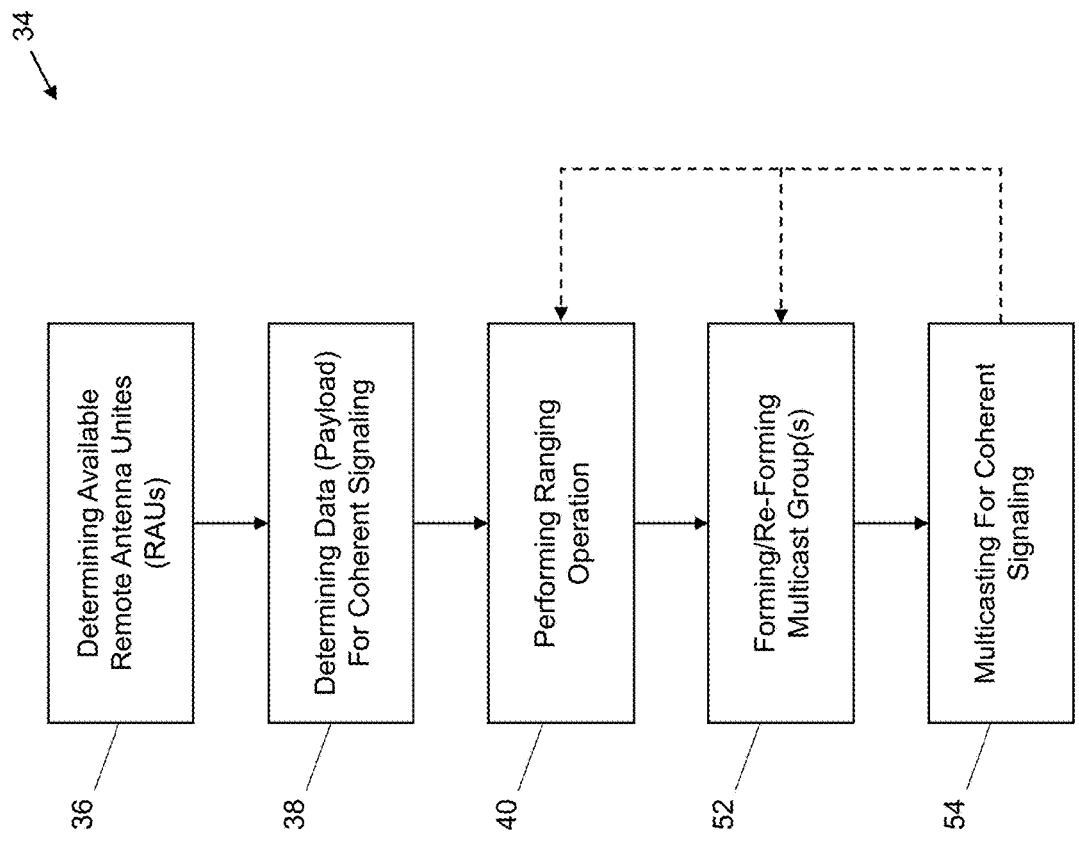
FIG. 3 illustrates a flowchart of a method for synchronizing wireless signaling in accordance with one non-limiting aspect of the present invention

FIG. 3 illustrates a flowchart 34 of a method for synchronizing wireless signaling to coherently add and subtract at a target location in accordance with one non-limiting aspect of the present invention. The method may be facilitated with the central coordination system, the remote antenna units, devices, etc. performing or executing corresponding processes, such as according to functions and other logical operations related to processor execution of non-transitory instructions stored on a computer-readable medium. Block 34 relates to determining remote antenna units (RAUs) available to facilitate client coherent signaling, which may include the central coordination system determining each RAU capable of communicating therewith or each RAU deployed within the overall communication system even if unable to speaking with a particular target location. Block 36 relates to determining data or other information, collectively referred to as payload, desired for transmission to a target device or a target location, e.g., multiple devices at one particular location. The method is predominately described with respect to transmitting a singular payload to a target location for exemplary purposes as the present invention fully contemplates leveraging its multicast capabilities to facilitate transmission of multiple payloads, optionally simultaneously, to the same target location or multiple target locations using the same or different remote antenna unit/multicast groups.

Block 40 relates to performing a ranging operation. The ranging operation may relate to iteratively transmitting a test signal from each of the available RAUs to determine those capable of reaching the target location and/or pre-selecting from locational information or other system-level data the RAUs capable of communicating with the target location, i.e., the RAUs capable of facilitating transmission of the payload to the desired device(s). The ranging process may correspond with iteratively transmitting signals from the RAUs according to different ranging parameters and assessing corresponding receipt at the target location until the attendant signaling is sufficient to facilitate coherent addition and/or subtraction at the target location. The ranging parameters may be the same parameters as the control parameters described above to facilitate controlling actual/real payload transmissions to the target location, e.g., the values of the ranging parameters may be iteratively changed until coherent signaling is achieved whereupon the last set of ranging values become the values for the control parameters. The ranging parameters are described merely to differentiate from the control parameters at least in that the ranging parameters are used to facilitate transmission of the test signal to the target location as opposed to transmission of the actual/real payload, i.e., transmission of information other than that determined in Block for transmission to the target location.

Figure 4:
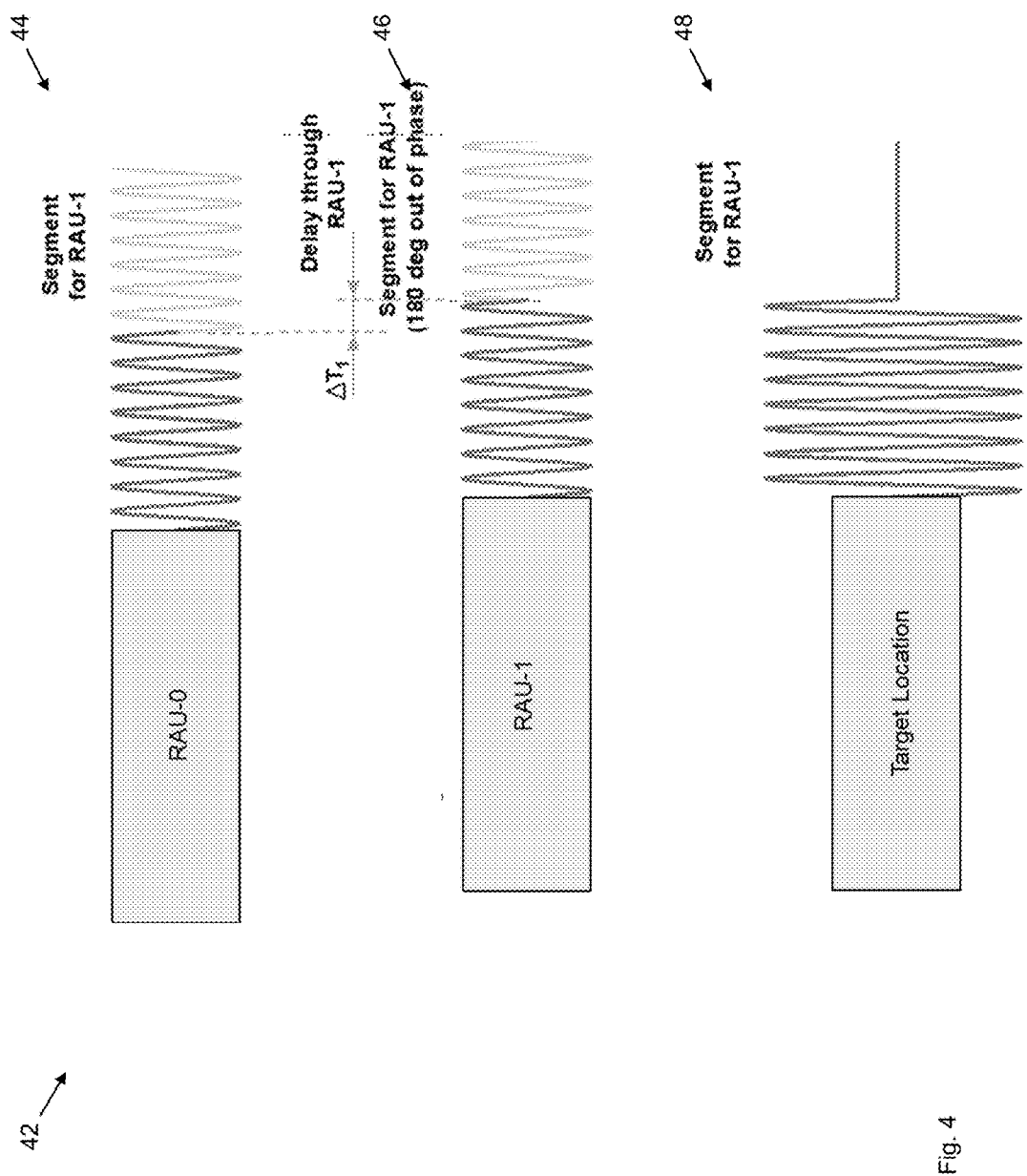
FIG. 4 illustrates a ranging process in accordance with one non-limiting aspect of the present invention.

FIG. 4 illustrates test signaling 42 for the ranging process in accordance with one non-limiting aspect of the present invention. The ranging process may include selecting a reference RAU as a baseline for coordinating signaling of other RAUs to the target location. The reference RAU may be indicated with an index of 0 with each of the other available RAUs individually associated with a unique value greater than 0 (RAU-0), which for exemplary purposes is illustrated with respect to one additional RAUs having an index value of 1 (RAU-1). The system illustrated in FIG. 1 includes five RAUs and the ranging process may be similarly performed for each of the five RAUs, and as such, the illustration is merely exemplary of processing contemplated by the present invention to facilitate determining control parameters necessary for facilitating coherent signaling at the target location. Transmission of training signal 44, 46 from the RAUs may be facilitated with the above-described multicast messages including a generic sinusoidal signal segments with specific phase information as the payload, i.e., by instructing through multicast messaging each RAU subjected to the ranging process to transmit a sinusoidal signal according to ranging parameters included therein. The ranging process may be an iterative process whereby multiple ranging messages may be multicasted to the available RAUs with correspondingly parameters sufficient to facilitate the operations contemplated herein.

FIG. 4 illustrates a summation signal 48 being generated at the target location according to test signaling 44, 46 emanating from RAU-1 the RAU-0 (reference RAU). The ranging parameters included in the attendant multicast messaging may be selected by the coordination system controller such that RAU-0 continuously transmits the sinusoidal signal without variation and RAU-1 begins to transmit a sinusoidal signal in a manner commensurate with RAU-0 and thereafter according to $\Delta T$ flips a phase of the sinusoidal signal 180°. The $\Delta T$ value used to instruct the RAU-1 when to flip the test signal becomes a known variable/value that can be used to assess a corresponding influence had the target location, which is shown to occur when the flipped, 180° out of phase signal from RAU-1 cancels/subtracts the test signal from RAU-0 at the target location from. FIG. 4 illustrates a segment of the test signal being flipped by RAU-1 for exemplary purposes as the test signal may include additional segments for each of the other RAUs being tested to flip along with corresponding instructions as to when those RAUs are to flip the corresponding portion of the test signal. The target device or other element at the target location may responsively measure the summation signal and communicate it or corresponding ranging results to the coordination system controller with responsive messaging. The coordination system controller can then assess the results to determine when the $\Delta T$ value in the ranging parameters set for RAU-1 produced the zero signal or otherwise induced a subtraction in the summation signal, i.e., the coordination system controller can work backwards from the $\Delta T$ value in the summation signal to determine timing differences between the signaling transmitted from RAU-0 and RAU-1.

The summation signal illustrates a complete cancellation within the summation signal due to RAU-1 exactly flipping a corresponding test segment of the sinusoidal signal in phase with the sinusoidal signal emanating from RAU-0. This may result from the coordination system controller selecting an appropriate $\Delta T$ value within the initial ranging parameters associated with the test signal from RAU-1. One non-limiting aspect of the present invention contemplates a difficulty in initially selecting such a $\Delta T$ value, i.e., a $\Delta T$ value sufficient to initially generate the complete cancellation, such that the processes associated with the ranging process may be iteratively performed according to different $\Delta T$ values for RAU-1 until the complete cancellation is achieved. The iterative process may include the coordination system controller assessing non-zero signaling in the summation signal 48 occurring relative to the $\Delta T$ value, i.e., when the RAU-1 was instructed to flip the sinusoidal signal segment, and based thereon, estimate or project an increase or decrease in the $\Delta T$ value sufficient to facilitate timing a flipping of the sinusoidal signal to occur in-phase with the test signal emanating from RAU-0. The interferences, attenuation or other signaling influences on the test signals may be relatively unknown during the ranging process such that the coordination system controller may be required to iteratively increase/decrease the $\Delta T$ value until the desired cancellation of the summation signal is achieved.

One non-limiting aspect of the present invention contemplates the RAU-1 attempting to transmit its signal for a period of time (calibration interval) occurring prior to being flipped according to the $\Delta T$ value. This may be beneficial in enabling the RAU-1 to calibrate timing for precisely determining when to flip the test signal. The summation signal 48 is shown for illustrative purposes as coherently adding during the calibration interval due to the illustrated $\Delta T$ value having produced a complete cancellation of the summation signal. The summation signal occurring during the calibration interval when the $\Delta T$ value fails to produce a complete cancellation may result in the attendant signaling having a different waveform, amplitude or other characteristics than that being illustrated. Once the coordination system controller determines a $\Delta T$ value sufficient for RAU-1 to produce the appropriate cancellation of the test signals from RAU-0 and RAU-1 at the target location, the process may be iteratively repeated with each additional RAU determined to be available in Block 36. The continued ranging process may include maintaining the $\Delta T$ value selected for RAU-1, i.e., the ranging value sufficient to achieve the desired subtraction of the signals from RAU-0 and RAU-1, with iterative variations in the ranging parameters for RAU-2 until the summation signal at the target location from RAU-0, RAU-1 and RAU-2 produces a complete cancellation. This may include the coordination system controller iteratively varying the $\Delta T$ value for RAU-2 until the desired cancellation is achieved. The process may be repeated on a similar one-by-one basis for each additional RAU until $\Delta T$ values producing the desired cancellation are determined for each available RAU.

Returning to FIG. 3, Block 52 relates to forming a multicast group to facilitate multicasted transmission of the payload to a target location from one or more RAUs. The multicast group may be formed by the central coordination system including control parameters for each of the group members within the corresponding multicast messages. The central coordination system may decide which RAUs participate and for how long based on a diversity on criteria that includes but is not limited to traffic, number of users, proximity to wireless end device, channels available etc. Block 54 relates to multicasting the payload from the RAUs within the attendant multicast group until an entirety of the payload is transmitted, e.g., multiple multicast messages may be generated and transmitted before an entirety of the desired transmission is completed. Dashed lines are illustrated to indicate optional processes whereby the central coordination system may periodically perform the ranging operation while information determined in Block 38 is still desired for transmission to the target location in order to generate or double-check the ranging/control parameters previously determined for purposes of assessing whether those parameters continue to be viable for coherent signaling as signaling conditions may change or other influences may want adjustments. Additional dashed lines are illustrated indicate an optional process whereby the central coordination system periodically re-forms or prunes/joins members from an existing operational multicast group, such as to facilitate leveraging multicast protocol capabilities to seamlessly and dynamically at RAUs and/or remove RAUs from ongoing coherent indications at the target location.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for synchronizing wireless signaling for coherent addition and subtraction at a target location, the method comprising:
   determining control parameters necessary for wireless signaling transmitted from a plurality of access points to coherently add at the target location;
   selecting one or more of the plurality of access points to be members of a first multicast group assigned to facilitate communication of a first payload to the target location; and
   transmitting a first message to the first multicast group having the first payload and the control parameters for the first multicast group to facilitate coherent addition of corresponding wireless signaling at the target location when communicating the first payload.

2. The method claim 1 further comprising performing a ranging operation to facilitate determining the control parameters whereby test signals are iteratively transmitted from the plurality of access points to the target location according to ranging parameters.

3. The method of claim 2 further comprising iteratively varying the ranging parameters until a conclusion of the ranging process, the conclusion occurring when the test signals from each of the plurality of access points in the first multicast group other than a reference access point of the first multicast group cancels with the test signal from the reference access point.

4. The method of claim 3 further comprising transmitting the test signals from the plurality of access points other than the reference access point out of phase relative to the test signals from the reference axis point.

5. The method of claim 4 further comprising transmitting the test signals with matching waveforms.

6. The method of claim 1 further comprising generating a $\Delta T$ value as one of the control parameters, each $\Delta T$ value specifying when the first payload is to be transmitted for the corresponding access point in order to coherently add at the target location with the payload transmitted from the other access points.

7. The method of claim 1 further comprising calculating the control parameters to include a $\Delta P$ value, each $\Delta P$ value specifying transmission power transmission of the first payload from the corresponding access point.

8. The method of claim 1 further comprising omitting from the first message the control parameters necessary to coherently add wireless signaling at the target location for one or more of the plurality of access points excluded from the first multicast group.

9. The method of claim 1 further comprising calculating the control parameters such that the first payload transmitted from each member of the first multicast group to the target location is identical.

10. The method of claim 1 further comprising:
    pruning one or more members from the first multicast group to create a second multicast group assigned to facilitate communication of a second payload to the target location; and
    multicasting a second message having the second payload to the second multicast group, the second message identifying the control parameters for the second multicast group to facilitate coherent addition of corresponding wireless signaling at the target location when communicating the second payload.

11. The method of claim 1 further comprising:
    joining one or more of the plurality of access points to the first multicast group to create a second multicast group assigned to facilitate communication of a second payload to the target location; and
    multicasting a second message having the second payload to the second multicast group, the second message identifying the control parameters for the second multicast group to facilitate coherent addition of corresponding wireless signaling at the target location when communicating the second payload.

12. A non-transitory computer-readable medium having a plurality of instructions executable with a processor to facilitate wireless signaling to at a target location, the plurality of instructions being sufficient for:
    performing a ranging process to determine control parameters necessary for wireless signaling transmitted from a plurality of access points to coherently add at the target location; and
    instructing the plurality of access points to transmit a payload to the target location according to the control parameters such that wireless signaling associated therewith coherently adds at the target location.

* * * * *